F. LESZCZEWICZ.
HORSE HITCH FOR VEHICLES.
APPLICATION FILED DEC. 11, 1916.
1,244,620.
Patented Oct. 30, 1917.
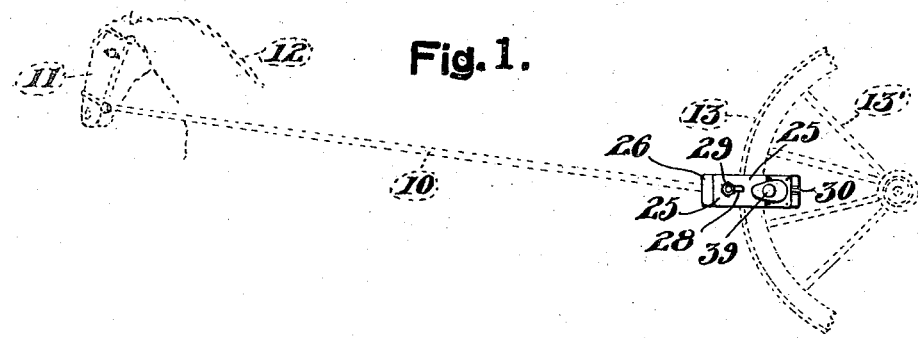
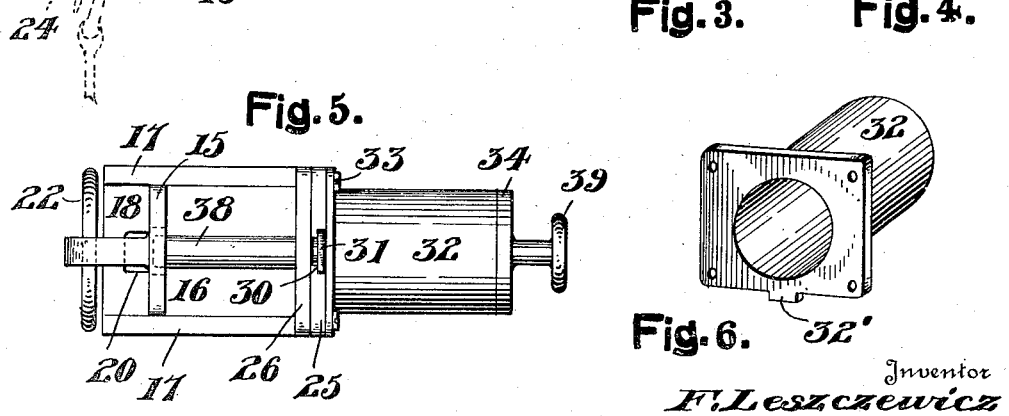
Inventor
F. Leszczewicz
By A. M. Wilson
Attorney

UNITED STATES PATENT OFFICE.

FRANK LESZCZEWICZ, OF CHICAGO, ILLINOIS.

HORSE-HITCH FOR VEHICLES.

1,244,620.　　　　　Specification of Letters Patent.　　Patented Oct. 30, 1917.

Application filed December 11, 1916. Serial No. 136,331.

*To all whom it may concern:*

Be it known that I, FRANK LESZCEWICZ, a subject of the Czar of Russia, residing at Chicago, in the county of Cook and State of Illinois, have invented certain new and useful Improvements in Horse-Hitches for Vehicles, of which the following is a specification.

This invention relates to new and useful improvements in a horse hitch for vehicles.

The primary object of the invention is the provision of a device secured to the end of a halter strap of a harness bridle, adapted for ready attachment to the wheel of the vehicle to which the animal is connected, whereby the halter will be drawn rearwardly in the event of the forward traveling of the animal.

This invention is designed to take the place of the usual anchoring or halter weight commonly employed with carriage horses, the provision being such that the horse is hitched to the rim of the vehicle wheels, whereby the head of the animal is pulled laterally and rearwardly for stopping his onward progress in the event that the animal starts to draw the vehicle forwardly. It is also designed to provide an anchoring means for horses which is employed with any usual form of halter, the device being of slight weight, readily carried in the vehicle and adjustable for the purpose of removable attachment to wheels of different sizes.

In the drawing forming a part of this application and in which like-reference characters denote corresponding parts throughout the several views, Figure 1 is a side elevation of the device in its operative position, in connection with a halter strap, the latter with a portion of the draft animal and vehicle wheel being illustrated by dotted lines.

Fig. 2 an enlarged sectional view of the device with the adjacent end of the halter strap indicated by dotted lines.

Fig. 3 is an elevational view of one side of the device.

Fig. 4 is a similar view of the other side thereof.

Fig. 5 is an end elevation of the same, and

Fig. 6 is a perspective view of the housing member with the return spring employed.

The present device is designed for employment with a halter strap 10, carried by the bridle 11 of the harness in the usual manner, the position of the horse 12, being indicated by dotted lines with respect to one of the front wheels 13 of the vehicle, not shown, to which the horse is attached, for drawing the same.

The device comprises an L-shaped bracket 14, having an anchor plate 15 slidably arranged thereon, with the shorter end 16 of the said plate slidably arranged between opposite ways 17 carried by the shorter end 18 of the said bracket. A bolt 19 upon the plate end 16 is shiftably connected through a slot 20 of the said bracket end 18, the plate and bracket being retained in their adjusted position by means of a set nut 21. A swinging ring 22 is carried by a lug 23 of the plate 15 to which a hook 24 at the free end of the halter 10 is adapted to be removably attached.

A slide 25 is shiftably arranged upon the longer arm 26 of the bracket 14, a bolt 27 being carried by the said arm projecting through a slot 28 in the slide, while a set nut 29 is arranged upon the said bolt for locking the slide in its adjusted position upon the arm 26. A slot 30 is arranged in the free end of the slide 25 for receiving a headed guide pin 31 therein.

A tubular housing 32 is secured to the slide 25 by screws 33, while a cam-shaped head 34 is normally positioned upon the outer closed end of the said housing having a stem 35 projecting axially therein, with one end of a spring 36 arranged within the housing secured to the free end of the said stem. A side lug 32' is carried by the housing 32 engaging with the adjacent tube 37, the said tube 37 outwardly projecting from the slide 25 adjacent the housing 32, and having a locking rod or bolt 38 slidably extending therein, the said rod being carried by the aforementioned head 34. The bolt also passes through a slot 40' in the bracket arm 26, a hand-hold knob 39 provided upon the head 34 may be grasped for forcing the rod 38 and stem 35 outwardly against the edge of the spring 36 thereby removing the free end of the rod 38 from the keeper slot 40 of the plate arm 15.

A complete operation of the device will be apparent from this detailed description of the same, it being understood that the device is readily attached to the strap 10 as noted, while by releasing the rod 38 from the keeper slot 40, the outer portion of the wheel 13, that is the felly and rim thereof, will be readily received between the plate 15 and bracket 14, and upon releasing the knob 39 the spring 36 will return the rod 38 for fitting inwardly of the felly, thereby mounting the device upon the wheel. It is obvious, however, that the device might be positioned upon one of the spokes 13' of the wheel or upon any other portion of the wagon or a stationary member if found desirable. The adjustable positioning of the slide 25 and the plate 15 upon the bracket 26 allows the device to be adjusted for different sized wheels. When the device is so positioned upon the wheel 13, any forward movement of the horse 12 tends to revolve the said wheel thereby either elevating or lowering the device, consequently exerting a pull upon the halter 10 and drawing rearwardly upon the bridle 11, causing the animal to stop.

What I claim as new is:—

An article of manufacture comprising an angular bracket having a longer and a shorter arm, each of which are provided with a longitudinal slot therethrough, an angular plate slidably mounted upon the said shorter arm of the bracket and having a longer arm opposite the longer arm of the bracket and arranged with a keeper slot in alinement with the said slot of said longer bracket arm, a retaining bolt carried by the shorter arm of said plate adjustably extending through the slot of the shorter bracket arm, a slide shiftably arranged upon the longer arm of said bracket, a tube projecting from said slide, a removable housing carried by said slide adjacent said tube, a cam-shaped head normally resting upon the outer ends of said housing and tube, a wheel retaining rod carried by said head slidably arranged through said tube and the slot of said longer bracket arm with its free end normally arranged within the slot of said longer plate arm, and a return spring in said rod arranged within said housing, having one end thereof operatively attached to said head.

In testimony whereof I affix my signature.

FRANK LESZCZEWICZ.

Copies of this patent may be obtained for five cents each, by addressing the "Commissioner of Patents, Washington, D. C."